United States Patent
Aso et al.

(10) Patent No.: US 10,428,162 B2
(45) Date of Patent: Oct. 1, 2019

(54) HYDROGENATION CATALYST AND PROCESS FOR PRODUCING OLEFIN POLYMER

(71) Applicant: SUMITOMO CHEMICAL COMPANY, LIMITED, Tokyo (JP)

(72) Inventors: Yuki Aso, Yokohama (JP); Noriyuki Satou, Kisarazu (JP); Shin-ichi Kumamoto, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 325 days.

(21) Appl. No.: 14/984,893

(22) Filed: Dec. 30, 2015

(65) Prior Publication Data

US 2016/0115254 A1 Apr. 28, 2016

Related U.S. Application Data

(62) Division of application No. 12/534,204, filed on Aug. 3, 2009, now abandoned.

(30) Foreign Application Priority Data

Aug. 8, 2008 (JP) .................................. 2008-205264

(51) Int. Cl.
| | |
|---|---|
| *C08F 4/6592* | (2006.01) |
| *C08F 4/52* | (2006.01) |
| *C08F 4/42* | (2006.01) |
| *C08F 10/00* | (2006.01) |
| *C08F 210/06* | (2006.01) |

(52) U.S. Cl.
CPC .......... *C08F 4/65925* (2013.01); *C08F 10/00* (2013.01); *C08F 210/06* (2013.01); *C08F 4/6592* (2013.01); *C08F 2410/01* (2013.01)

(58) Field of Classification Search
CPC .................................................. C08F 4/69525
See application file for complete search history.

(56) References Cited

U.S. PATENT DOCUMENTS

| 4,547,476 A | 10/1985 | Terano et al. |
| 5,391,660 A | 2/1995 | Numao et al. |
| 6,214,949 B1 * | 4/2001 | Reddy ..................... C08F 10/06 |
| | | 526/113 |

FOREIGN PATENT DOCUMENTS

| CN | 1279248 A | | 1/2001 |
| JP | 04110308 A | | 4/1992 |
| JP | 08-14108 | * | 6/1996 |
| JP | 08-151408 | * | 6/1996 |
| JP | 8-151408 A | | 11/1996 |
| JP | 10-204123 A | | 8/1999 |

OTHER PUBLICATIONS

Chinese Office Action dated Sep. 13, 2012 issued in a corresponding Chinese Patent Application No. 200910165736.3.
Communication dated Aug. 22, 2017 from the Patent Office of the Cooperation Council for the Arab States of the Gulf in counterpart the Arab States application No. GCC/P/2009/14065.

* cited by examiner

*Primary Examiner* — Robert D Harlan
(74) *Attorney, Agent, or Firm* — Sughrue Mion, PLLC

(57) ABSTRACT

The present invention provides a hydrogenation catalyst, which can produce an olefin polymer having a higher molecular weight, and a process for producing an olefin polymer having a higher molecular weight, by controlling hydrogen concentration in a polymerization reaction system efficiently in polymerizing an olefin in the presence of hydrogen. There is provided a hydrogenation catalyst formed by contacting the undermentioned component (A), the undermentioned component (B), and the undermentioned component (C). There is further provided a process for producing an olefin polymer characterized by polymerizing an olefin in the presence of hydrogen, the undermentioned component (A), the undermentioned component (B), and the undermentioned component (D). Component (A): a titanocene compound; Component (B): a silicon compound represented by the undermentioned general formula [1]: $Si(OR^1)_4$ [1]; Component (C): an alkyl metal compound; Component (D): a catalyst for olefin polymerization.

7 Claims, No Drawings

HYDROGENATION CATALYST AND PROCESS FOR PRODUCING OLEFIN POLYMER

CROSS REFERENCE TO RELATED APPLICATIONS

This application is a divisional of U.S. application Ser. No. 12/534,204, filed Aug. 3, 2009, which claims benefit to Japanese Patent Application No. 2008-205264, filed on Aug. 8, 2008, the disclosure of each of which is incorporated herein by reference in its entirety.

FIELD OF THE INVENTION

The present invention relates to a hydrogenation catalyst and a process for producing an olefin polymer.

BACKGROUND OF THE INVENTION

Heretofore, in a process for producing an olefin polymer by use of gas phase polymerization reaction in the presence of hydrogen, there has been known a method for controlling hydrogen concentration within a gas phase polymerization reaction vessel, which comprises lowering hydrogen concentration within the gas phase polymerization reaction vessel by taking out a portion of a hydrogen-containing gas within the gas phase polymerization reaction vessel, then adding hydrogen in the gas taken out to an olefin to hydrotreat the gas, and thereafter feeding the hydrotreated gas again to the polymerization reaction vessel. (Refer to, for example, Patent Document 1.)

Furthermore, in a process for producing an olefin polymer in the presence of hydrogen, there has been known a method for controlling molecular weight distribution or the like of the olefin polymer produced by adding a hydrogenation catalyst to a reaction vessel to lower hydrogen concentration. (Refer to, for example, Patent Document 2.)

[Patent Document 1] JP-A-10-204123
[Patent Document 2] JP-A-8-151408

BRIEF SUMMARY OF THE INVENTION

However, in the method for controlling hydrogen concentration disclosed in the above Patent Document 1, it was necessary to provide a reaction layer separately in order to use a hydrogenation catalyst, and there was the problem that clogging of the reaction layer or a circulating gas line or deterioration of catalyst performance was caused.

Furthermore, in the method of adding a hydrogenation catalyst to a reaction vessel as disclosed in the above Patent Document 2, there were the problems that a large amount of a hydrogenation catalyst was necessary, and that hydrogen concentration could not be sufficiently lowered.

In view of such current situation, the purpose of the present invention resides in providing a hydrogenation catalyst, which can produce an olefin polymer having a higher molecular weight, and a process for producing an olefin polymer so that an olefin polymer having a higher molecular weight can be produced, by controlling hydrogen concentration in a polymerization reaction system efficiently in polymerizing an olefin in the presence of hydrogen.

The present inventors have devoted themselves to study for solving the above problems. As a result, they have found that by adding a titanocene compound and a specific silicon compound in a polymerization reaction system, hydrogen concentration in the polymerization reaction system can be lowered efficiently and an olefin polymer having a higher molecular weight can be produced, and have led to accomplishment of the present invention.

That is, the present invention relates to a hydrogenation catalyst formed by contacting the undermentioned component (A), the undermentioned component (B), and the undermentioned component (C).

Component (A): a titanocene compound
Component (B): a silicon compound represented by the undermentioned general formula [1]

$$Si(OR^1)_4 \qquad [1]$$

In the formula, $R^1$ stands for a hydrocarbon group having 1 to 20 carbon atoms. Four $R^1$ may be same or different respectively.

Component (C): an alkyl metal compound

Furthermore, the present invention relates to a process for producing an olefin polymer characterized by polymerizing an olefin in the presence of hydrogen, the undermentioned component (A), the undermentioned component (B), and the undermentioned component (D).

Component (A): a titanocene compound
Component (B): a silicon compound represented by the undermentioned general formula [1]

$$Si(OR^1)_4 \qquad [1]$$

In the formula, $R^1$ stands for a hydrocarbon group having 1 to 20 carbon atoms. Four $R^1$ may be same or different respectively.

Component (D): a catalyst for olefin polymerization

Moreover, the present invention relates to a process for producing an olefin polymer, which comprises polymerizing an olefin in the presence of hydrogen and the undermentioned component (D), characterized by having a step of adding the undermentioned component (A) into a polymerization reaction system and a step of adding the undermentioned component (B).

Component (A): a titanocene compound
Component (B): a silicon compound represented by the undermentioned general formula [1]

$$Si(OR^1)_4 \qquad [1]$$

In the formula, $R^1$ stands for a hydrocarbon group having 1 to 20 carbon atoms. Four $R^1$ may be same or different respectively.

Component (D): a catalyst for olefin polymerization

In addition, the present invention relates to a process for producing an olefin polymer, which comprises having two or more olefin polymerization steps different in olefin polymerization conditions and polymerizing an olefin in the presence of hydrogen and the undermentioned component (D), characterized by having a step of adding the undermentioned component (A) and a step of adding the undermentioned component (B) into a polymerization reaction system in the second and subsequent olefin polymerization steps.

Component (A): a titanocene compound
Component (B): a silicon compound represented by the undermentioned general formula [1]

$$Si(OR^1)_4 \qquad [1]$$

In the formula, $R^1$ stands for a hydrocarbon group having 1 to 20 carbon atoms. Four $R^1$ may be same or different respectively.

Component (D): a catalyst for olefin polymerization

ADVANTAGES OF THE INVENTION

According to the present invention, in a process for producing an olefin polymer, which comprises polymerizing an olefin in the presence of hydrogen, hydrogen concentration in a polymerization reaction system can be controlled efficiently and an olefin polymer having a higher molecular weight can be produced.

DETAILED DESCRIPTION OF THE INVENTION

Hereinafter, the present invention is explained in more detail.

1) Hydrogenation Catalyst

The hydrogenation catalyst is a catalyst having capability to hydrogenate selectively olefinic unsaturated double bonds, and hydrogen present in a polymerization reaction vessel reacts with an olefin such as propylene, ethylene or the like and is removed as propane or ethane.

The hydrogenation catalyst of the present invention is characterized by being formed by contacting the undermentioned component (A), the undermentioned component (B), and the undermentioned component (C).

Component (A): a titanocene compound
Component (B): a silicon compound represented by the undermentioned general formula [1]

$$Si(OR^1)_4 \quad [1]$$

In the formula, $R^1$ stands for a hydrocarbon group having 1 to 20 carbon atoms. Four $R^1$ may be same or different respectively.

Component (C): an alkyl metal compound

As a titanocene compound of component (A), a titanocene compound represented by the undermentioned general formula [3] is preferable.

$$Cp_n TiX^1_{4-n} \quad [3]$$

In the formula, Cp stands for a group selected from substituted or unsubstituted cyclopentadienyl group, indenyl group, or fluorenyl group, $X^1$ stands for a group selected from hydrogen, halogen, alkoxy group, amino group, alkyl group having 1 to 10 carbons, or aryloxy group, and n stands for an integer of 1 to 3. The respective ligands may be bonded together through a crosslinking group.

Among them, a biscyclopentadienyl compound having two cyclopentadienyl groups is preferable.

Specifically, there are cited bis(cyclopentadienyl)titanium dichloride, bis(cyclopentadienyl)titanium dibromide, bis(cyclopentadienyl)titanium diiodide, bis(cyclopentadienyl) titanium difluoride, bis(cyclopentadienyl)titanium chlorbromide, bis(cyclopentadienyl)titanium methoxychloride, bis(cyclopentadienyl)titanium ethoxychloride, bis(cyclopentadienyl)titanium phenoxychloride, bis(cyclopentadienyl)titanium dimethoxide, bis(cyclopentadienyl)titanium diphenoxide, and the like.

They may be used singly or in a combination of two or more kinds.

The silicon compound represented by the above-mentioned general formula [1] of component (B) specifically includes tetramethoxysilane, tetraethoxysilane, tetrapropoxysilane, tetrabutoxysilane, tetrabenzyloxysilane, dimethoxydiethoxysilane, diethoxydipropoxysilane, diethoxydibutoxysilane, methoxytriethoxysilane, and ethoxytripropoxysilane. Among them, tetramethoxysilane, tetraethoxysilane, and tetrapropoxysilane.

They may be used singly or in a combination of two or more kinds.

The molar ratio of silicon atom of component (B) and titanium atom of component (A) is preferably 1:1 to 10000:1, more preferably 10:1 to 1000:1, and further more preferably 100:1 to 500:1.

The alkyl metal compound of component (C) includes, for example, alkyl aluminum compound, alkyl lithium compound, alkyl magnesium compound, alkyl zinc compound, and the like. Among them, use in combination with an alkyl aluminum compound is preferable.

The above alkyl aluminum compound includes, for example, trialkyl aluminum, alkyl aluminum halide, alkyl aluminum hydride, aluminum alkoxide, almoxane, and the like.

A trialkyl aluminum includes, for example, trimethyl aluminum, triethyl aluminum, triisobutyl aluminum, trihexyl aluminum, trioctyl aluminum, tridecyl aluminum, and the like.

An alkyl aluminum halide includes, for example, diethyl aluminum monochloride, diisobutyl aluminum monochloride, ethyl aluminum sesquichloride, ethyl aluminum dichloride, and the like.

An alkyl aluminum hydride includes, for example, diethyl aluminum hydride, diisobutyl aluminum hydride, and the like.

An aluminum alkoxide includes, for example, diethyl aluminum ethoxide, diethyl aluminum phenoxide, and the like.

An almoxane includes, for example, methyl almoxane, ethyl almoxane, isobutyl almoxane, methylisobutyl almoxane, and the like.

Among them, a trialkyl aluminum is preferable, and triethyl aluminum is more preferable.

They may be used singly or in a combination of two or more kinds.

The molar ratio of metal atoms of an alkyl metal compound and a titanocene compound is preferably 1:1 to 30:1, more preferably 2:1 to 10:1, and further more preferably 3:1 to 7:1.

The hydrogenation catalyst of the present invention can be favorably used for controlling hydrogen concentration in a polymerization reaction system efficiently and producing an olefin polymer having a higher molecular weight in a process for producing an olefin polymer, which comprises polymerizing an olefin in the presence of hydrogen.

With regard to component (A), component (B) and component (C) used in the hydrogenation catalyst of the present invention, in a process for producing an olefin polymer mentioned later, a product formed by contacting two or more components of component (A), component (B) and component (C) in advance may be added in a polymerization reaction vessel, or respective components of component (A), component (B) and component (C) may be separately added in a polymerization reaction vessel.

2) Process For Producing Olefin Polymer

The process for producing an olefin polymer of the present invention is characterized by polymerizing an olefin in the presence of hydrogen, the above-mentioned component (A), the above-mentioned component (B), and the undermentioned component (D).

Component (D): a catalyst for olefin polymerization

As the catalyst for olefin polymerization of component (D), there can be used publicly known polymerization catalysts used for olefin polymerization, and there can be cited Ziegler-Natta catalysts, which are disclosed in, for example, JP-A-57-63310, JP-A-58-83006, JP-A-61-78803, JP-A-7-216017, JP-A-10-212319, JP-A-62-158704, and JP-A-11-92518, or metallocene type catalysts, which are disclosed in JP-A-5-155930, JP-A-9-143217, JP-A-2002-293817, JP-A-2003-171412, JP-A-8-511044, and JP-A-2001-31720.

Ziegler-Natta catalysts are preferably materials formed by contacting the undermentioned component (a) and the undermentioned component (b), and more preferably materials formed by contacting the undermentioned component (a), the undermentioned component (b), and the undermentioned component (c):

component (a): a solid component containing titanium, magnesium and a halogen,
component (b): an alkyl aluminum compound, and
component (c): an electron-donating compound.

As examples of a method for preparing the component (a), there can be shown the following methods (1) to (5):
(1) a method of contacting a halogenated magnesium compound and a titanium compound,
(2) a method of contacting a halogenated magnesium compound, an electron donor, and a titanium compound,
(3) a method of dissolving a halogenated magnesium compound and a titanium compound in an electron-donating solvent to obtain a solution and then impregnating the solution into a carrier material,
(4) a method of contacting a dialkoxy magnesium compound, a halogenated titanium compound, and an electron donor, and
(5) a method of contacting a solid component containing magnesium atom, titanium atom, and a hydrocarbon oxy group, a halogenated compound, and an electron donor and/or an organic acid halide.

Among them, the solid component obtained by the method of (5) is preferable, and the solid component containing a phthalic acid ester compound as an electron donor is more preferable.

An alkyl aluminum compound of component (b) includes, for example, trialkyl aluminum, alkyl aluminum halide, alkyl aluminum hydride, aluminum alkoxide, almoxane, and the like.

A trialkyl aluminum includes, for example, trimethyl aluminum, triethyl aluminum, triisobutyl aluminum, trihexyl aluminum, trioctyl aluminum, tridecyl aluminum, and the like.

An alkyl aluminum halide includes, for example, diethyl aluminum monochloride, diisobutyl aluminum monochloride, ethyl aluminum sesquichloride, ethyl aluminum dichloride, and the like.

An alkyl aluminum hydride includes, for example, diethyl aluminum hydride, diisobutyl aluminum hydride, and the like.

An aluminum alkoxide includes, for example, diethyl aluminum ethoxide, diethyl aluminum phenoxide, and the like.

An almoxane includes, for example, methyl almoxane, ethyl almoxane, isobutyl almoxane, methylisobutyl almoxane, and the like.

Among them, a trialkyl aluminum is preferable, and triethyl aluminum is more preferable.

They may be used singly or in a combination of two or more kinds.

As an electron-donating compound of component (c), there is preferably used a silicon compound represented by the following general formula [2]:

$$R^2_r Si(OR^3)_{4-r} \qquad [2]$$

wherein $R^2$ stands for hydrogen atom, a hydrocarbon group having 1 to 20 carbon atoms, or a hetero atom-containing group, $R^3$ stands for a hydrocarbon group having 1 to 20 carbon atoms, and r stands for an integer of 0 to 3, and when plural $R^2$ are present, plural $R^2$ may be respectively same or different, and when plural $R^3$ are present, plural $R^3$ may be respectively same or different.

A hydrocarbon group having 1 to 20 carbon atoms of $R^2$ includes, for example, straight chain alkyl group having 1 to 20 carbon atoms, branched chain alkyl group having 1 to 20 carbon atoms, cycloalkyl group having 1 to 20 carbon atoms, cycloalkenyl group having 1 to 20 carbon atoms, aryl group having 1 to 20 carbon atoms, and the like.

A straight chain alkyl group having 1 to 20 carbon atoms includes, for example, methyl group, ethyl group, propyl group, butyl group, pentyl group, and the like.

A branched chain alkyl group having 1 to 20 carbon atoms includes, for example, isopropyl group, sec-butyl group, tert-butyl group, tert-amyl group, and the like.

A cycloalkyl group having 1 to 20 carbon atoms includes, for example, cyclopentyl group, cyclohexyl group, and the like.

A cycloalkenyl group having 1 to 20 carbon atoms includes, for example, cyclopentenyl group, and the like.

An aryl group having 1 to 20 carbon atoms includes for example, phenyl group, tolyl group, and the like.

A hetero atom-containing group of $R^2$ includes, for example, oxygen atom-containing group, nitrogen atom-containing group, sulfur atom-containing group, phosphorus atom-containing group, and the like. Specifically, there are cited dialkylamino group such as dimethylamino group, methylethylamino group, diethylamino group, ethyl-n-propylamino group, or di-n-propylamino group, pyrrolyl group, pyridyl group, pyrrolidinyl group, piperidyl group, perhydroindolyl group, perhydroisoindolyl group, perhydroquinolyl group, perhydroisoquinolyl group, perhydrocarbazolyl group, perhydroacrydinyl group, furyl group, pyranyl group, perhydrofuryl group, thienyl group, and the like. Among them, preferable is a group having a hetero atom which can bond directly to the silicon atom of a silicon compound.

A hydrocarbon group having 1 to 20 carbon atoms of $R^3$ includes those which are same as the examples shown as a hydrocarbon group having 1 to 20 carbon atoms of $R^2$.

A preferable electron-donating compound is a silicon compound having as $R^2$ at least one hydrocarbon group having a secondary or tertiary carbon atom bonded directly to silicon atom or at least one dialkylamino group in the above-mentioned general formula [2].

Preferable concrete examples of an electron-donating compound include diisopropyldimethoxysilane, di-tert-butyldimethoxysilane, tert-butylmethyldimethoxysilane, tert-butylethyldimethoxysilane, tert-butyl-n-propyldimethoxysilane, tert-butyl-n-butyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, tert-butylisopropyldimethoxysilane, dicyclobutyldimethoxysilane, cyclobutylisopropyldimethoxysilane, cyclobutylisobutyldimethoxysilane, cyclobutyl-tert-butyldimethoxysilane, dicyclopentyldimethoxysilane, cyclopentylisopropyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, diisopropyldiethoxysilane, diisobutyldiethoxysilane, di-tert-butyldiethoxysilane, tert-butylmethyldiethoxysilane, tert-butylethyldiethoxysilane, tert-butyl-n-propyldiethoxysilane, tert-butyl-n-butyldiethoxysilane, tert-amylmethyldiethoxysilane, tert-amylethyldiethoxysilane, tert-amyl-n-propyldiethoxysilane, tert-amyl-n-butyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, 2-norbornane-methyldimethoxysilane, bis(perhydroquinolino)dimethoxysilane, bis(perhydroisoquinolino)dimethoxysilane, (perhydroquinolino)(perhydroisoquinolino)dimethoxysilane, (perhydroquinolino)methyldimethoxysilane, (perhydroisoquinolino)methyldimethoxysilane, (perhydroquinolino)ethyldimethoxysilane, (perhydroisoquinolino)ethyldimethoxysilane, (perhydroquinolino)(n-propyl)dimethoxysilane, (perhydroisoquinolino)(n-propyl)dimethoxysilane, (perhydroquinolino)(tert-butyl)dimethoxysilane, (perhydroisoquinolino)(tert-butyl)dimethoxysilane, and diethylaminotriethoxysilane.

They may be used singly or in a combination of two or more kinds.

When a metallocene type catalyst is used as a catalyst for olefin polymerization, as a metallocene compound, preferable is a metallocene compound represented by the following general formula [4]:

$$Cp_nMX_{4-n} \qquad [4]$$

wherein Cp is a group selected from substituted or unsubstituted cyclopentadienyl group, indenyl group, or fluorenyl group, M is an element selected from zirconium and hafnium, X is a group selected from hydrogen, halogen, alkoxy group, amino group, alkyl group having 1 to 10 carbons, or aryloxy group, plural Cps and Xs may be bonded together through a crosslinking group, and n stands for an integer of 1 to 3.

In the process for producing an olefin polymer of the present invention, it is preferable to polymerize olefin in the presence of hydrogen, the above-mentioned component (A), the above-mentioned component (B), the above-mentioned component (C), and the above-mentioned component (D).

[Polymerization Steps]

The process for producing an olefin polymer of the present invention can be applied to not only batch polymerization process but also continuous polymerization process. In addition, when, for example, a metallocene type catalyst is used as a catalyst for olefin polymerization, in many cases the resulting olefin polymers have unsaturated bonds at their terminals. It appears that such unsaturated bonds would be formed by dehydrogenation of the saturated terminals once produced, and therefore there is the possibility that such hydrogen would be gradually concentrated in a circulating olefin. Thus, in such a case, the present invention can be applied as a technique for controlling the hydrogen concentration in a single polymerization step.

Furthermore, in some cases the present invention is necessary also in a multistage polymerization having plural polymerization steps different in polymerization conditions. In a multistage polymerization, polymerization may be carried out by changing polymerization conditions in a single reaction vessel, or polymerization may be carried out in plural reaction vessels different in polymerization conditions, which are connected in series. The present invention can be applied, when hydrogen concentration in the subsequent stage is lowered efficiently as compared with the precedent stage in a single reaction vessel, or in order to efficiently lower hydrogen flowing with powders from the precedent stage reaction vessel into the subsequent stage reaction vessel in a multistage polymerization using plural reaction vessels.

Therefore, in the process for producing an olefin polymer of the present invention, as long as an olefin can be polymerized in the presence of hydrogen, a single stage polymerization using single polymerization conditions may be carried out or a multistage polymerization consisting of plural polymerization steps different in polymerization conditions may be carried out, and polymerization may be carried out by use of a single reaction vessel or polymerization may be carried out by use of plural reaction vessels. Herein, polymerization conditions mean polymerization form, temperature, pressure, raw material composition, and the like, and polymerization form means liquid phase polymerization or gas phase polymerization. When a multistage polymerization is used, liquid phase polymerization and gas phase polymerization may be used in combination. Liquid phase polymerization means bulk polymerization or slurry polymerization, and gas phase polymerization means mixing vessel type gas phase polymerization, fluidized bed type gas phase polymerization, or entrained bed type gas phase polymerization.

In the process for producing an olefin polymer of the present invention, when excess alkyl aluminum compound is used for a catalyst for olefin polymerization of component (D), the excess alkyl aluminum compound has an effect similar to that of an alkyl metal compound of component (C), and hence in such a case component (C) need not be further added.

Furthermore, in the process for producing an olefin polymer of the present invention, component (A), component (B), and, as needed, component (C) may be present in a polymerization reaction vessel before initiation of olefin polymerization, or a step of adding component (A), a step of adding component (B), and, as needed, a step of adding component (C) may be present in the stage of growth process of an olefin polymer.

Moreover, in the case of a multistage polymerization having two or more olefin polymerization steps different in olefin polymerization conditions, it is preferable to add component (A), component (B), and, as needed, component (C) in the second and subsequent olefin polymerization steps.

In addition, the process for producing an olefin polymer of the present invention is carried out preferably by use of a gas phase reaction vessel. As the gas phase reaction vessel, preferable is a fluidized bed type one wherein a gas is flown vertically and upwardly in a cylindrical reaction vessel provided with a gas-dispersing board.

With regard to the addition place of component (A), component (B), and, as needed, component (C), when they are added in a gas phase reaction vessel, they are preferably added to a bed portion thereof. The bed portion means a powder-concentrated portion having a bulk density of polymerized powder of not less than 0.10 g/cc in a gas phase reaction vessel. In the present invention, preferably component (A), component (B), and, as needed, component (C) are added to a bed portion having a bulk density of polymerized powder of not less than 0.13 g/cc and not more than 0.70 g/cc, and more preferably component (A), component (B), and, as needed, component (C) are added to a bed portion having a bulk density of polymerized powder of not less than 0.16 g/cc and not more than 0.50 g/cc.

The addition place of component (A), component (B), and, as needed, component (C) in a fluidized bed type gas phase polymerization is preferably within a bed portion formed just above a dispersing board, from the standpoint of mixing a polymer and the respective components sufficiently and increasing hydrogenation performance. When the height of a dispersing board is presumed as 0 and the height of a bed portion is presumed as H, these components are preferably added to a portion having a height of 0 to 0.5 H and most preferably added to a portion having a height of 0 to 0.3 H.

With regard to the amount of a titanocene compound charged, the molar amount of titanium atom in a titanocene compound to 1 kg of polymerized powders in a reaction vessel (mmol/kg) is preferably not less than 0.0001 mmol/kg and not more than 1 mmol/kg, more preferably not less than 0.0003 mmol/kg and not more than 0.5 mmol/kg, and most preferably not less than 0.001 mmol/kg and not more than 0.1 mmol/kg.

Component (A), component (B), and, as needed, component (C) may be charged continuously or intermittently in a reaction vessel.

Component (A) can be fed after diluted with an inert organic solvent. In so doing, as component (A) a product (component (A')) formed by contacting it with component (C) in advance may be used. The above inert organic solvent means a solvent that does not react with any material participating in hydrogenation reaction. As a preferable solvent, there are cited aliphatic hydrocarbons such as butane, pentane, hexane, heptane, octane and the like, and the isomers thereof, and cycloaliphatic hydrocarbons such as cyclohexane, cycloheptane and the like, and the derivatives thereof.

[Main Polymerization]

In the process for producing an olefin polymer of the present invention, an olefin polymer produced in a reaction vessel may be a homopolymer or a copolymer. As examples of an olefin to be polymerized in the present invention, there can be shown ethylene, propylene, 1-butene, 1-pentene, 1-hexene, 1-octene, 1-decene, 4-methyl-1-pentene, 3-methyl-1-pentene, styrene, butadiene, isoprene, 1,4-hexadiene, dicyclopentadiene, 5-ethylidene-2-norbornene, and the like, and the olefin is determined depending on the kind of the desired polymer product. That is, when, for example, polyethylene, polypropylene, polybutene and the like are produced as a homopolymer product, and EPR (ethylene-propylene copolymer), PBR (propylene-butene copolymer), EPBR (ethylene-propylene-butene copolymer) and the like are produced as a copolymer product, olefins to be used in polymerization steps are ethylene, propylene, and butene, and in some cases an extremely small amount of the other olefins are used.

In the case of multistage polymerization, the same polymer may be produced in each stage, or polymers different in compositions may be produced. In case the same polymer is produced in each stage, a hydrogen content in the subsequent stage gas phase reactor can be decreased by adding the above component (A) and the above component (B) into the subsequent stage polymerization reaction system, and thus an olefin polymer having a broad molecular weight distribution, in which a polymer produced in the subsequent stage has a molecular weight higher than that of a polymer produced in the precedent stage, can be produced. Additionally, in case polymers different in compositions are produced in each stage, the present invention can be used in the production of an olefin polymer which contains a polymer having a lower molecular weight produced in the precedent stage and a polymer having a higher molecular weight produced in the subsequent stage and having a composition different from that of the precedent stage.

The process for producing an olefin polymer of the present invention is preferably a process for producing an ethylene-propylene block copolymer comprising a first polymerization step of polymerizing propylene in the presence of hydrogen and the above component (D) to obtain a propylene homopolymer and a second polymerization step of polymerizing ethylene and propylene in the presence of the propylene homopolymer obtained in the first polymerization step to obtain an ethylene-propylene copolymer, further comprising the steps of adding the above component (A) and the above component (B) into the reaction system of the above second polymerization step.

In the above process for producing an ethylene-propylene block copolymer, the ratio of the limiting viscosity of the propylene homopolymer obtained in the first polymerization step to the limiting viscosity of the ethylene-propylene copolymer obtained in the second polymerization step is preferably 2 to 20, more preferably 2.5 to 15, and further preferably 3.5 to 10.

The first polymerization step and/or the second polymerization step may be a single-stage polymerization step or a multistage polymerization step.

Polymerization temperature is different depending on the kind of a monomer, the molecular weight of a product, and the like, but is not more than the melting point of an olefin polymer, preferably lower by 10° C. or more than the melting point, more preferably room temperature to 200° C., specially preferably 40 to 160° C., and most preferably 60 to 130° C. Furthermore, in order to maintain polymerization temperature within this range, the polymerization system is cooled by a cooling apparatus. In addition, polymerization pressure is atmospheric pressure to 15 MPa, preferably 0.2 to 7 MPa, and most preferably 1 to 5 MPa.

When the present invention is applied to a multistage polymerization, it is preferable to maintain the hydrogen concentration of a gas phase portion in the precedent stage at the condition not more than 30%. Even if the hydrogen concentration is high enough to exceed 30%, there is no particular problem in carrying out the production process of the present invention, but a large amount of hydrogen introduced into the subsequent stage increases the concentration of the olefin hydride (propane, ethane, or the like) produced in a gas phase reaction vessel and lowers polymerization activity in the subsequent stage, and hence it is not preferable that the hydrogen concentration is too high.

Furthermore, when a hydrogenation catalyst is added in a gas phase reaction vessel, it is preferable to have a step of adding a polymerization activity depressant in a polymerization reaction system from the standpoints of improvement of powder properties and improvement of polymer properties.

The polymerization activity depressant used herein includes, for example, an electron-donating compound, an active hydrogen-containing compound, and an oxygen-containing compound gaseous at normal temperatures and normal pressures, and the depressant generally has the action of lowering the activity of an olefin polymerization catalyst.

The electron-donating compound includes alkoxysilanes, esters, ethers, and the like.

The active hydrogen-containing compound includes alcohols, water, and the like.

The oxygen-containing compound gaseous at normal temperatures and normal pressures includes oxygen, carbon monoxide, carbon dioxide, and the like.

The alkoxysilanes include tetrabutoxysilane, tetraethoxysilane, tetramethoxysilane, and the like.

The alcohols include methanol, ethanol, propanol, butanol, and the like.

The polymerization activity depressant is preferably an active hydrogen-containing compound or an oxygen-containing compound gaseous at normal temperatures and normal pressures, is more preferably alcohols, oxygen or carbon monoxide, and is further preferably methanol, ethanol, propanol, butanol, oxygen or carbon monoxide.

Polymerization activity depressants may be used singly or in a combination of two or more kinds.

[Prepolymerization]

Before polymerization step a small amount of an olefin may be polymerized (hereinafter referred to as prepolymerization) to form a prepolymerization catalyst component. As examples of an olefin to be prepolymerized, there can be shown ethylene, propylene, 1-butene, 1-pentene, 1-hexene, 1-octene, 1-decene, 4-methyl-1-pentene, 3-methyl-1-pentene, styrene, butadiene, isoprene, 1,4-hexadiene, dicyclopentadiene, 5-ethylidene-2-norbornene, and the like. The amount of an olefin to be prepolymerized is usually 0.1 to 200 g per g of the catalyst component. As a method for the prepolymerization, there are cited publicly known methods such as a method of feeding a small amount of an olefin in the presence of the catalyst component and an organic aluminum compound and carrying out prepolymerization in slurry state by use of a solvent. As a solvent used in prepolymerization, there are cited inert hydrocarbons such as propane, butane, isobutane, pentane, isopentane, hexane, heptane, octane, cyclohexane, benzene, toluene and the like, and liquid olefins, and they may be used in a mixture of two or more kinds. In addition, slurry concentration in prepolymerization is usually 1 to 500 g and preferably 3 to 150 g as the weight of catalyst component contained in 1 L of a solvent.

The amount of an organic aluminum compound used in prepolymerization is 0.1 to 700 moles per mole of a transition metal atom contained in the catalyst component, preferably 0.2 to 200 moles, and more preferably 0.2 to 100 moles. In prepolymerization, an electron donor such as an alkoxysilicon compound or the like may be present as needed. The amount of an electron donor used is preferably 0.01 to 400 moles per mole of a transition metal atom contained in the catalyst component, more preferably 0.02 to 200 moles, further more preferably 0.03 to 100 moles.

Prepolymerization temperature is usually −20 to +100° C. and preferably 0 to +80° C. In addition, prepolymerization time is usually 2 minutes to 15 hours.

EXAMPLES

Hereinafter, the present invention is explained by way of Examples and Comparative Examples. Measurements and evaluations of physical properties were carried out by the undermentioned methods.

(1) Limiting Viscosity (unit: dl/g)

By use of Ubbelohde viscometer, reduced viscosities were measured at three concentrations of 0.1, 0.2 and 0.5 g/dl under the conditions of tetralin solvent and temperature: 135° C. Subsequently, limiting viscosity was obtained by extrapolation method of plotting the reduced viscosities to the concentrations and extrapolating the concentrations to zero, in accordance with the calculation method disclosed in "Polymer Solution, Polymer Experimental Study 11" (published by Kyoritsu Shuppan Co., Ltd. in 1982), page 491.

(2) Copolymerized Portion Content (unit: weight %)

The copolymerized portion content X (weight %) produced in the first stage copolymerization step was calculated by the undermentioned formula.

$$X=(Pb-Pa)/Pb \times 100$$

Pa: Polymer weight per hour discharged from the third stage propylene polymerization step
Pb: Polymer weight per hour discharged from the first stage copolymerization step (3) Limiting Viscosity (unit: dl/g) of Polymer Produced in Copolymerized Portion Limiting viscosity $[\eta]a$ (dl/g) of the polymer component produced in the third stage propylene polymerization step, and limiting viscosity $[\eta]b$ (dl/g) of the polymer component produced in the first stage copolymerization step were calculated by the undermentioned formulas.

$$[\eta]a=[\eta]1$$

$$[\eta]b=([\eta]2-[\eta]a \times (1-X/100))/(X/100)$$

$[\eta]1$: Limiting viscosity (dl/g) of the polymer after the third stage propylene polymerization step
$[\eta]2$: Limiting viscosity (dl/g) of the polymer after the first stage copolymerization step Example 1

[Preparation of Titanocene Compound Solution]

The inside of a flask having 1 L inner volume was replaced with nitrogen. Into this vessel 4.5 g of dicyclopentadienyltitanium dichloride (manufactured by KANTO CHEMICAL CO., INC.) and 928 mL of hexane were charged and at the same time stirred at room temperature, and 72 millimoles of triethyl aluminum was charged to obtain a solution. This solution was further diluted with hexane.

[Prepolymerization]

Into an autoclave made of SUS having 3 L inner volume and fitted with a stirrer, 1.5 L of n-hexane sufficiently subjected to dehydration and degasification treatments, 30 millimoles of triethyl aluminum, and 3.0 millimoles of cyclohexylethyldimethoxysilane were charged. Therein 16 g of a solid catalyst component, which was prepared by a method same as that of Example 1 of Japanese patent application No. 2008-277945, was added, 32 g of propylene was continuously fed in about 40 minutes while keeping the temperature in the autoclave at about 3 to 10° C., and prepolymerization was carried out. Subsequently, the prepolymerized slurry was transferred to an autoclave made of SUS having 200 L inner volume and fitted with a stirrer, and 132 L of liquid butane was added to form a prepolymerization catalyst component slurry.

By use of the prepolymerization catalyst component slurry prepared as mentioned above, three stage propylene homopolymerizations were carried out respectively in different reactors to produce polypropylene particles. Subsequently, in the presence of the polypropylene particles, one stage copolymerization of propylene and ethylene was carried out to produce a propylene-ethylene block copolymer. Hereinafter, each polymerization stage is explained.

[The First Stage Propylene Polymerization (Liquid Phase Polymerization Reaction)]

By use of a Bessel type reactor having 163 L inner volume and fitted with a stirrer, homopolymerization of propylene was carried out. That is, propylene, hydrogen, triethyl aluminum, cyclohexylethyldimethoxysilane, and the prepolymerization catalyst component slurry were continuously fed in the reactor. The reaction conditions were polymerization temperature: 73° C., stirring velocity: 150 rpm, liquid level of the reactor: 44 L, feed rate of propylene: 25 kg/hour, feed rate of hydrogen: 160 NL/hour, feed rate of triethyl aluminum: 40.9 millimoles/hour, feed rate of cyclohexylethyldimethoxysilane: 6.13 millimoles/hour, and feed rate of the prepolymerization catalyst component slurry (calculated in terms of the polymerization catalyst component): 0.481 g/hour. In the reactor the average residence time of the slurry was 0.74 hour, and the amount of polypropylene particles discharged was 5.4 kg/hour.

[The Second Stage Propylene Polymerization (Liquid Phase Polymerization Reaction)]

The slurry, which had undergone the above first propylene polymerization, was continuously transferred to another reactor (Bessel type), and homopolymerization of propylene was further carried out. In this connection, feeding of propylene and hydrogen to the reactor was not carried out. The reaction conditions were polymerization temperature: 69° C., stirring velocity: 150 rpm, and liquid level of the reactor: 44 L. In the reactor the average residence time of the slurry was 0.85 hour, and the amount of polypropylene particles discharged was 10.1 kg/hour.

[The Third Stage Propylene Polymerization (Gas Phase Polymerization Reaction)]

The polypropylene particles obtained through the above second propylene polymerization were continuously transferred to a fluidized bed reactor having 1.4 m³ inner volume and fitted with a stirrer, propylene and hydrogen were continuously fed to this reactor, and homopolymerization of propylene was further carried out, while purging the excess gas so as to keep the pressure constant. Reaction conditions were polymerization temperature: 80° C., polymerization pressure: 1.8 MPa, circulating gas flow rate: 100 m³/hour, feed rate of propylene: 10 kg/hour, feed rate of hydrogen: 900 NL/hour, and polymer particle hold amount in the fluidized bed: 50 kg. In the reactor the average residence time of polymer particles was 3.2 hour, the gas concentration ratio (mole %) of hydrogen/(hydrogen+propylene) in the reactor was 9.1, the amount of polymer particles discharged was 15.6 kg/hour, and the limiting viscosity thereof was 0.99 dl/g.

[The First Stage Copolymerization (Gas Phase Polymerization Reaction)]

The polypropylene particles obtained through the above third propylene polymerization were continuously transferred to another fluidized bed reactor having 1 m³ inner volume and fitted with a gas-dispersing board and a stirrer; propylene, ethylene, and hydrogen were continuously fed to this reactor; and copolymerization of propylene and ethylene was carried out, while purging the excess gas so as to keep the pressure constant. Reaction conditions were polymerization temperature: 70° C., polymerization pressure: 1.4 MPa, circulating gas flow rate: 140 m³/hour, feed rate of propylene: 22.5 kg/hour, feed rate of ethylene: 6.8 kg/hour, feed rate of hydrogen: 200 NL/hour, and polymer particle hold amount in the fluidized bed: 85 kg. Furthermore, to the bed portion were added the above-mentioned titanocene compound solution in an amount corresponding to 2.32 millimoles calculated in terms of titanocene molecular weight and tetraethoxysilane in an amount of 0.50 mole calculated in terms of tetraethoxysilane molecular weight per mole of triethyl aluminum fed to the first stage propylene polymerization reactor. A bulk density of polymerized powder in a bed portion was 0.305 g/cc. Moreover, to the reactor was added, as a polymerization activity depressant, oxygen in an amount corresponding to 1.4 millimoles calculated in terms of oxygen molecular weight per mole of triethyl aluminum fed to the first stage propylene polymerization reactor. In the reactor the average residence time of polymer particles was 4.2 hour; as the gas concentration ratio (mole %) in the reactor, ethylene/(propylene+ethylene) was 23, and hydrogen/(hydrogen+propylene+ethylene) was 0.26; the amount of polymer particles discharged was 20.3 kg/hour; the limiting viscosity of the copolymerized portion was 5.6 dl/g; and the copolymerized portion content was 23 weight %.

Comparative Example 1

Except that the tetraalkoxysilane was not added, the polymer hold amount was adjusted so as to give the same copolymerized portion content as in Example 1. In the reactor the average residence time of polymer particles was 2.9 hour; as the gas concentration ratio (mole %) in the reactor, ethylene/(propylene+ethylene) was 27, and hydrogen/(hydrogen+propylene+ethylene) was 0.59; the limiting viscosity of the copolymerized portion was 4.9 dl/g; hydrogen concentration was high; and the molecular weight of the copolymerized portion was low.

Comparative Example 2

Without charging the tetraalkoxysilane and the titanocene compound solution, polymerization was carried out while adjusting the polymer hold amount so as to give the same copolymerized portion content as in Example 1. In the reactor the residence time of polymer particles was 3.9 hour; as the gas concentration ratio (mole %) in the reactor, ethylene/(propylene+ethylene) was 27, and hydrogen/(hydrogen+propylene+ethylene) was 1.5; the limiting viscosity was 3.5 dl/g; hydrogen concentration was high; and the molecular weight of the copolymerized portion was low.

The invention claimed is:
1. A process for producing an olefin polymer, the process comprising:
　a prepolymerization step; and
　after the prepolymerization step, two or more olefin polymerization steps different in olefin polymerization conditions;
　wherein the prepolymerization step includes prepolymerizing an olefin in the presence of the undermentioned component (D);
　wherein the polymerization steps include polymerizing an olefin in the presence of hydrogen and the undermentioned component (D), and includes a step of adding the undermentioned component (A) and a step of adding the undermentioned component (B) into a polymerization reaction system in any one or more of the second and subsequent olefin polymerization steps,
　wherein a hydrogen content in the polymerization reaction system, after the step of adding the component (A) and the step of adding the component (B), is lower than a hydrogen content in the polymerization reaction system in a precedent olefin polymerization step:

component (A): a titanocene compound, component (B): a silicon compound represented by the undermentioned general formula [1]:

$$Si(OR^1)_4 \quad [1]$$

wherein, in formula [1], $R^1$ stands for a hydrocarbon group having 1 to 20 carbon atoms, and the four $R^1$ may be same or different respectively, and component (D): a catalyst for olefin polymerization formed by contacting the undermentioned component (a), the undermentioned component (b), and the undermentioned component (c):

component (a): a solid component containing titanium, magnesium and a halogen, component (b): an alkyl aluminum compound, and component (c): a silicon compound represented by the following general formula [2]:

$$R^2_r Si(OR^3)_{4-r} \quad [2]$$

wherein, in formula [2], $R^2$ stands for hydrogen atom, a hydrocarbon group having 1 to 20 carbon atoms, or a hetero atom-containing group, $R^3$ stands for a hydrocarbon group having 1 to 20 carbon atoms, and r stands for an integer of 1 to 3, and when plural $R^2$ are present, plural $R^2$ may be respectively same or different, and when plural $R^3$ are present, plural $R^3$ may be respectively same or different.

2. The process for producing an olefin polymer as set forth in claim 1, wherein the second and subsequent olefin polymerization steps are each carried out in a reaction vessel containing a polymerized powder, and the amount of the component (A) added in the step of adding the component (A), in terms of a molar amount of titanium atom in the component (A), to 1 kg of the polymerized powder in the reaction vessel to which the component (A) is added is not less than 0.0001 mmol/kg and not more than 1 mmol/kg.

3. The process for producing an olefin polymer as set forth in claim 1, wherein the process further comprises a step of adding the undermentioned component (C) into a polymerization reaction system in any one or more of the second and subsequent olefin polymerization steps:

component (C): an alkyl metal compound.

4. The process for producing an olefin polymer as set forth in claim 1, wherein the reaction vessel to which the component (A) and the component (B) are added is a gas phase reaction vessel, the gas phase reaction vessel has a bed portion therein, the component (A) and the component (B) are added to the bed portion of the gas phase reaction vessel, and the bed portion has a bulk density of polymerized powder of not less than 0.13 g/cc and not more than 0.70 g/cc.

5. The process for producing an olefin polymer as set forth in claim 3, wherein the reaction vessel to which the component (A), the component (B), and the component (C) are added is a gas phase reaction vessel, the gas phase reaction vessel has a bed portion therein, the component (A), the component (B), and the component (C) are added to the bed portion of the gas phase reaction vessel, and the bed portion has a bulk density of polymerized powder of not less than 0.13 g/cc and not more than 0.70 g/cc.

6. The process for producing an olefin polymer as set forth in claim 1, wherein a gas phase portion in a stage precedent to the step of adding the component (A) has a hydrogen concentration of not more than 30%.

7. A process for producing an olefin polymer, the process comprising:

a prepolymerization step; and after the prepolymerization step, two or more olefin polymerization steps different in olefin polymerization conditions;

wherein the prepolymerization step includes prepolymerizing an olefin in the presence of the undermentioned component (D);

wherein the polymerization steps include an olefin in the presence of hydrogen and the undermentioned component (D), and includes a step of adding the undermentioned component (A) and a step of adding the undermentioned component (B) into a polymerization reaction system in any one or more of the second and subsequent olefin polymerization steps, wherein olefin polymers obtained in the respective steps of the two or more olefin polymerization steps are different from one another:

component (A): a titanocene compound, component (B): a silicon compound represented by the undermentioned general formula [1]:

$$Si(OR^1)_4 \quad [1]$$

wherein, formula [1], $R^1$ stands for a hydrocarbon group having 1 to 20 carbon atoms, and the four $R^1$ may be same or different respectively, and component (D): a catalyst for olefin polymerization formed by contacting the undermentioned component (a), the undermentioned component (b), and the undermentioned component (c):

component (a): a solid component containing titanium, magnesium and a halogen, component (b): an alkyl aluminum compound, and component (c): a silicon compound represented by the following general formula [2]:

$$R^2_r Si(OR^3)_{4-r} \quad [2]$$

wherein, in formula [2], $R^2$ stands for hydrogen atom, a hydrocarbon group having 1 to 20 carbon atoms, or a hetero atom-containing group, $R^3$ stands for a hydrocarbon group having 1 to 20 carbon atoms, and r stands for an integer of 1 to 3, and when plural $R^2$ are present, plural $R^2$ may be respectively same or different, and when plural $R^3$ are present, plural $R^3$ may be respectively same or different.

* * * * *